April 27, 1926.
J. R. MARCHESSEAULT
1,582,290
ELECTRICALLY HEATED BREAKFAST SET
Filed April 27, 1925   3 Sheets-Sheet 2
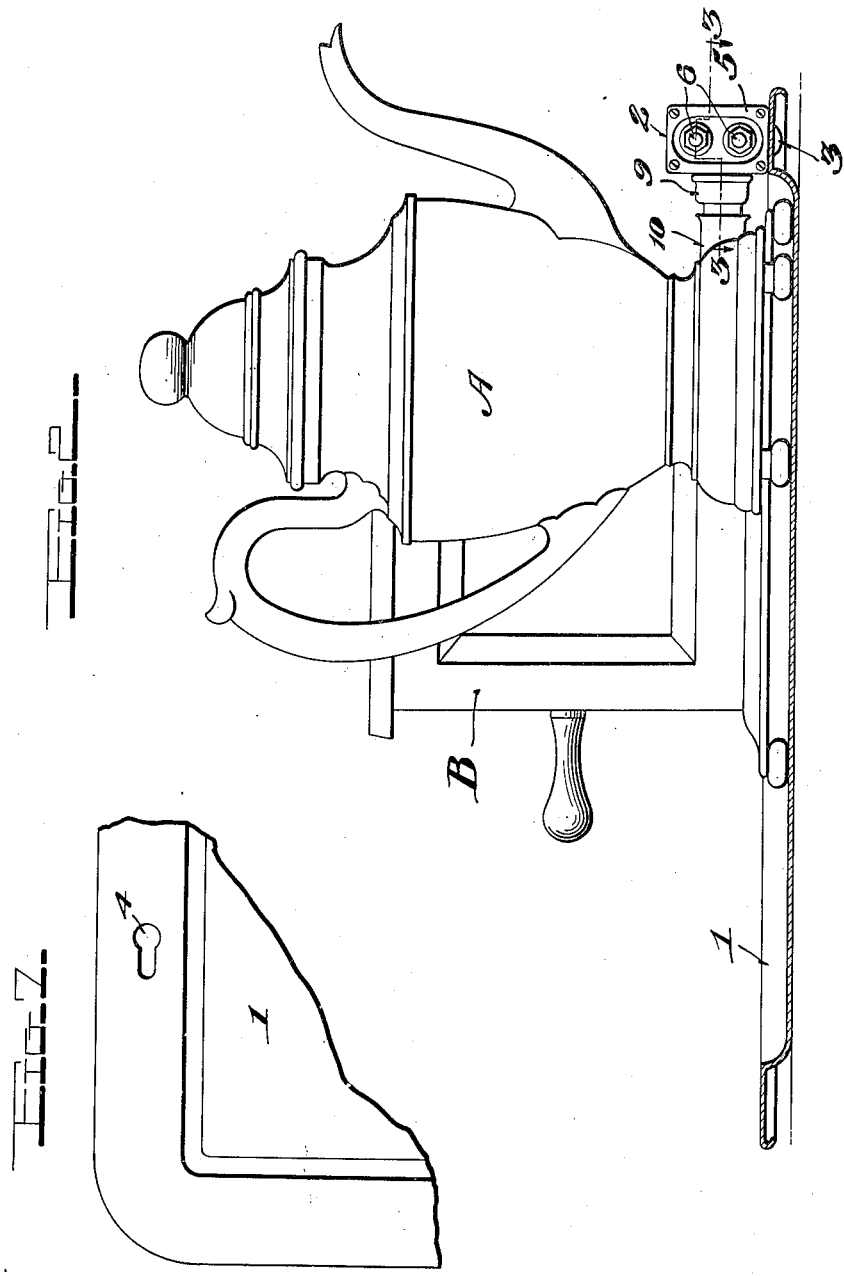
Inventor
Joseph R. Marchesseault
By Joseph A. Miller
Attorney

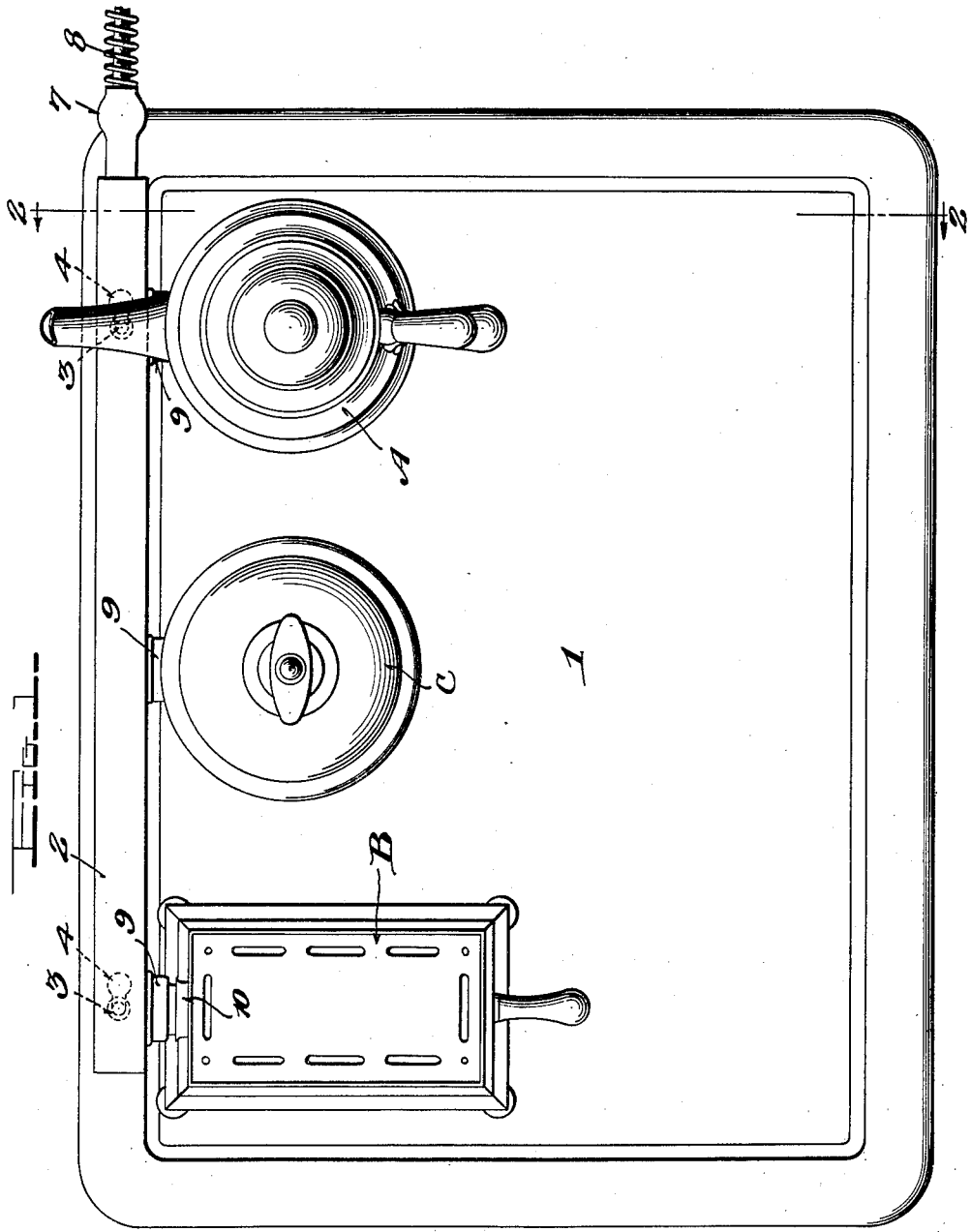

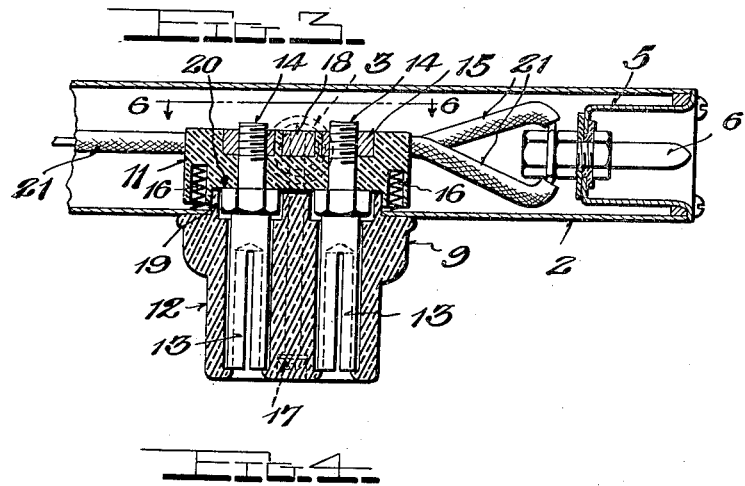
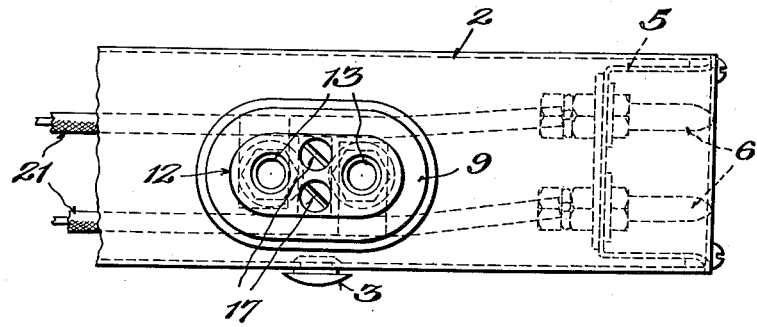
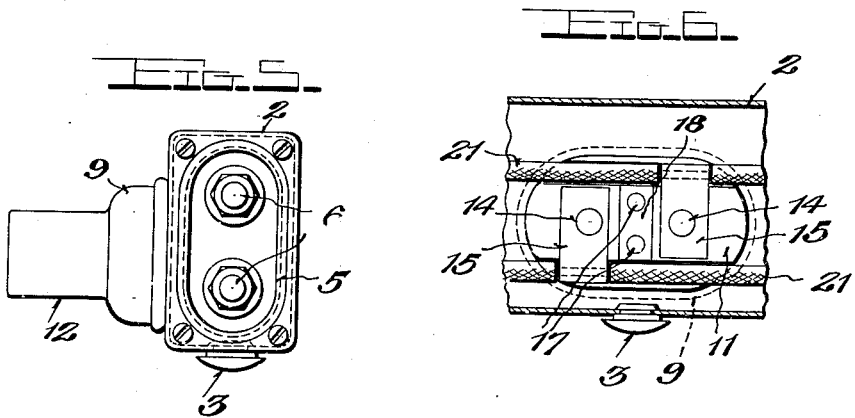

Patented Apr. 27, 1926.

1,582,290

UNITED STATES PATENT OFFICE.

JOSEPH ROI MARCHESSEAULT, OF CRANSTON, RHODE ISLAND, ASSIGNOR TO GORHAM MFG. COMPANY, OF PROVIDENCE, RHODE ISLAND.

ELECTRICALLY-HEATED BREAKFAST SET.

Application filed April 27, 1925. Serial No. 26,017.

*To all whom it may concern:*

Be it known that I, JOSEPH R. MARCHESSEAULT, a citizen of the United States, residing at Cranston, in the county of Kent and State of Rhode Island, have invented new and useful Improvements in Electrically-Heated Breakfast Sets, of which the following is a specification.

This invention relates to certain new and useful improvements in electrically heated breakfast sets, and the primary object of the invention is to provide a portable service tray equipped to removably receive a plurality of electrically heated cooking utensils comprising the set, such as a coffee pot, tea pot, toaster, waffle iron, etc., and to heat each of the utensils employed from a common electric service line, thereby to dispense with the necessity of the customary use of individual sockets and cords which are ordinarily connected to the outlets of the lighting fixtures or other source of electrical supply and to each of the utensils employed.

A further object of the invention is to provide a set of the character described which is of simple and economical construction and which closely preserves the appearance of customary or conventional trays now in general use.

In the drawings:—

Figure 1 is a top plan view of a breakfast set constructed in accordance with the present invention;

Figure 2 is a section on line 2—2 of Fig. 1,

Figure 3 is a section on line 3—3 of Fig. 2,

Figure 4 is a side elevation of Fig. 3,

Figure 5 is an end elevation of Fig. 3,

Figure 6 is a section on line 6—6 of Fig. 3, and

Figure 7 is a detail view of an end of the tray showing one of the key-hole slots.

In proceeding in accordance with the present invention a portable service tray 1 which may be of any desired shape or design is employed, but which, however, must be of a size to accommodate thereon all of the electrically heated vessels or utensils which are to be grouped on the tray.

A tube 2, or rail, forming a housing for the feed wires and a carrier for the plugs extends longitudinally along a side of the tray and preferably is removably attached thereto to enable easy cleaning of the parts. For the latter purpose, the tube is provided on its bottom with headed studs 3 formed to be received in key-hole like openings 4 formed in the rim of the tray, whereby the tube may be easily and quickly removed and replaced by mere sliding of the tube to bring the heads of the studs into and out of register with the enlarged ends of the openings 4.

One end of the tube, as depicted in Figure 1 of the drawings, extends to an adjacent end of the tray and is equipped with a socket 5 secured on its interior and provided with terminals 6 for connection with the usual plug 7 having a cord 8 provided with the usual feed wires. The opposite end of the cord 8 is provided with a usual socket for connection to any service outlet, for example, an electric light fixture, or floor or wall outlet.

The tube 2 is provided with a series of lateral plugs 9, there being as many of the plugs as there are vessels or utensils, the plugs projecting over the tray 1 so as to enable the tea or coffee urn or pot A, bread toaster B, or other utensils C, to be merely placed on the tray and then slid, to have their sockets 10 operatively connected to the plugs 9 so as to receive current from the feed wires.

The lateral plugs 9 are formed with bases 11 and heads 12 each formed of insulating material, the heads being provided with the usual clips 13 to engage the customary metal terminals (not shown) of the sockets 10, as is well understood in the art. The inner ends of the clips are engaged with the heads of screws 14, which latter extend through the bases 11 and are threaded into engagement with contact clips 15 embedded in the bases 11. Coil springs 16 are housed in sockets provided therefor in the bases 11 and engage a wall of the tube 2 so as to provide a flexible connection of the plug structure 9 to the tube in order to assure proper alinement of the utensils or the like when in connected position. Screws 17 extend through the heads of the sockets and through the bases and are threaded into yokes 18 embedded in the bases in order to rigidly connect the heads and bases of the plugs together. The heads 12 further have collars 19 received in cut-outs 20 in the bases so as to assure of proper alinement of the parts in assembly thereof. Feed wires 21 are connected to the terminals of the socket 5 and extend lengthwise within the tube, being connected to the contact clips 15 of each of the lateral plugs 9.

From the foregoing it will be seen that but one connection to a service outlet is required for the connection thereto and heating of any desired number of utensils which the tray is initially equipped with, and that the utensils can be connected and disconnected at will from the source of current supply. The entire device is readily portable and can be moved about the table or other support within the range of movement permitted by the cord and with all of the utensils thereon, whether connected to or disconnected from the source of supply.

The tubular housing or conductor rail 2 is moreover instantaneously removable from and connectible to the tray in the sense that no manipulation of screws or other movable parts is required to effect removal and connection.

Having thus described my invention, what I claim as new and desire to secure by Letters Patent is:—

1. In an electrically heated breakfast set or the like, a portable tray, a tubular housing extending along a side of the tray, means to connect the housing to the tray to permit of instantaneous removal and connection thereof, a socket in one end of the housing for receiving a plug that is connected to a service outlet, feed wires in the housing connected to the socket, a series of lateral plugs, means to flexibly connect the plugs to the housing, said plugs having contacts a series of utensils having electric heating means therein formed to be carried by the tray and having contact devices for removable engagement with said plug contacts, and means to connect each of the lateral plugs to the feed wires.

2. In an electrically heated breakfast set or the like, a portable tray, a series of utensils having electric heating means therein carried by the tray, a tubular housing extending along a side of the tray, means to connect the housing to the tray to permit of instantaneous removal and connection thereof, a socket in one end of the housing for receiving a plug that is connected to a service outlet, feed wires in the housing connected to the socket, a series of lateral plugs connected to the housing and to the feed wires therein, contacts carried by the plugs, and contacts carried by the utensils for removable engagement with the plug contacts.

3. A portable service set including a tray, electrically connected contacts carried by the tray, a series of utensils having electric heating means therein seated on the upper face of the tray, and contacts carried by the utensils for engagement with the tray contacts, all of the contacts being located above the upper face of the tray, the said upper face of the tray being substantially flat and uninterrupted throughout, and the tray contacts being located closely adjacent to a marginal part of the tray, whereby upon removal of the utensils, the entire upper face of the tray can be used alone.

4. A portable service set, including a portable tray having a rim, an independent housing seated on the rim, means to removably connect the housing to the rim, conductors in the housing, a series of utensils having electric heating means therein slidably seating on the upper face of the tray and having contacts spaced above the upper face of the tray, and contacts carried by the housing for engagement with the contacts of the utensils.

5. A portable service set, including a portable tray, conductors carried by the tray, a series of lateral horizontal contacts connected to the conductors and extending above the upper face of the tray, a series of utensils having electric heating means therein slidably seating on the upper face of the tray, and contacts carried by the utensils and located above the upper face of the tray for engagement with the contacts of the conductors, one of the series of contacts being flexibly mounted so as to allow of movement thereof in engaging the contacts of the utensils with those of the tray.

6. A portable service set including a portable tray having a continuous uninterrupted upper face, a member having conductors, contacts carried by the conductors, utensils having electric heating means therein slidably seating on the upper face of the tray and having contacts engageable with the conductor contacts, and means to removably connect the member to the tray, whereby upon removal of the member and the utensils, the entire upper face of the tray can be used alone.

7. A portable service set including a tray, electrically connected contacts carried by the tray and located above the upper face thereof, a series of utensils having electric heating means therein seated on the upper face of the tray and being slidable thereon, and contacts carried by the utensils for engagement with the tray contacts, all of the contacts being horizontally disposed and located at points above the upper face of the tray so that upon lateral sliding of the utensils on the upper face of the tray, the contacts of the utensils and trays may be engaged with each other, the upper face of the tray being substantially flat and uninterrupted throughout whereby upon removal of the utensils the entire upper face of the tray can be used alone.

In testimony whereof I have signed my name to this specification.

JOSEPH ROI MARCHESSEAULT.